United States Patent
Logue

(10) Patent No.: US 8,229,049 B1
(45) Date of Patent: Jul. 24, 2012

(54) METHOD AND APPARATUS FOR PROVIDING A MONITOR USING AN AUXILIARY DELAY LINE

(75) Inventor: John D. Logue, Placerville, CA (US)

(73) Assignee: Xilinx, Inc., San Jose, CA (US)

( * ) Notice: Subject to any disclaimer, the term of this patent is extended or adjusted under 35 U.S.C. 154(b) by 647 days.

(21) Appl. No.: 12/358,468

(22) Filed: Jan. 23, 2009

(51) Int. Cl.
*H04L 7/00* (2006.01)
*H04J 3/06* (2006.01)
*H03L 7/00* (2006.01)

(52) U.S. Cl. .................. 375/354; 370/518; 327/161
(58) Field of Classification Search .......... 375/224, 375/226, 354, 355, 371, 373; 370/516–519; 327/141, 152, 153, 161
See application file for complete search history.

(56) References Cited

U.S. PATENT DOCUMENTS

| 7,515,664 | B1 * | 4/2009 | Yeoh .............................. 375/354 |
| 2007/0217559 | A1 * | 9/2007 | Stott et al. ..................... 375/355 |
| 2009/0179681 | A1 * | 7/2009 | Nakamura et al. ............ 327/299 |

OTHER PUBLICATIONS

Day, Brandon, "16-Channel, DDR LVDS Interface with Real-Time Window Monitoring", Application Note: Virtex-5 FPGAs, XAPP860 (v1.1), Jul. 17, 2008, 43 pages, Xilinx, Inc., 2100 Logic Drive, San Jose, CA 95124.
Xilinx, ISE 9.1i, Iserdes, Virtex-5 Libraries Guide for HDL Designs, Dec. 8, 2006, pp. 151-158, Xilinx, Inc., 2100 Logic Drive, San Jose, CA USA.

* cited by examiner

*Primary Examiner* — Young T. Tse
(74) *Attorney, Agent, or Firm* — Kin-Wah Tong

(57) ABSTRACT

In one embodiment, a monitor circuit is disclosed. For example, the monitor circuit includes a first delay line circuit having a plurality of delay taps for receiving data from a data channel, and a second delay line circuit having a plurality of points for sampling the data received from the first delay line circuit, where the plurality of points comprises an input point, a middle point and an output point. The monitor circuit further includes a voltage control circuit for providing a control voltage to the second delay line circuit, and a data compare circuit for comparing a data value of the input point and a data value of the middle point to produce a first out-of-bounds signal, and for comparing the data value of the middle point and a data value of the output point to produce a second out-of-bounds signal.

20 Claims, 5 Drawing Sheets

METHOD AND APPARATUS FOR PROVIDING A MONITOR USING AN AUXILIARY DELAY LINE

FIELD OF THE INVENTION

One or more aspects of the present invention relate generally to an integrated circuit, and more specifically to the implementation of a data eye monitor using an auxiliary delay line.

BACKGROUND OF THE INVENTION

Processing systems often require the rapid transfer of data between a plurality of integrated circuits (ICs). As computing processes continue to increase in complexity, various processing systems have deployed processing elements to handle ever increasing complexity and volume of computations. For example, the processing elements can be central processing units (CPUs) and the like. As the speed of the processing elements increases, the speed of the interface between the ICs must also increase to avoid becoming a limiting constraint.

However, one important aspect of the interface is the proper time alignment between two ICs (e.g., a transmitting device and a receiving device). More specifically, when data is passed between the two ICs, they need to be properly aligned so that a sampling clock, e.g., a rising edge and/or a falling edge of the sampling clock, of the receiving device will be properly aligned to sample or capture the data when it is presented to the receiving device.

Although the transmitting device and the receiving device can be initially aligned, e.g., via the use of training samples, the time alignment can change over time due to drift. Many factors can contribute to the increase or decrease of drift, e.g., changing temperature or changing supply voltage. As such, if the time alignment is not dynamically maintained during the operation of the transmitting device and the receiving device, then there is a possibility that the sampling clock of the receiving device will become misaligned and the wrong data will be captured by the receiving device.

SUMMARY OF THE INVENTION

In one embodiment of the present invention, a monitor circuit is disclosed that comprises a first delay line circuit having a plurality of delay taps for receiving data from a data channel, and a second delay line circuit having a plurality of points for sampling the data received from the first delay line circuit, where the plurality of points comprise an input point, a middle point and an output point. The monitor circuit further comprises a voltage control circuit for providing a control voltage to the second delay line circuit, and a data compare circuit for comparing a data value of the input point and a data value of the middle point to produce a first out-of-bounds signal, and for comparing the data value of the middle point and a data value of the output point to produce a second out-of-bounds signal, wherein the first out-of-bounds signal and the second out-of-bounds signal are used to select one of the plurality of delay taps of the first delay line circuit or to adjust the control voltage provided to the second delay line circuit.

In an alternative embodiment, a monitor circuit comprises a first delay line circuit having a plurality of delay taps for receiving data from a data channel, and a second delay line circuit having a plurality of delay tap points for sampling the data received from the first delay line circuit, where the plurality of delay tap points comprises a set of left delay tap points, a middle delay tap point, and a set of right delay tap points. The monitor circuit further comprises a data compare circuit for comparing a data value of each of the set of left delay tap points and a data value of the middle delay tap point to produce a set of decrement mismatch signals, and for comparing a data value of each of the set of right delay tap points and the data value of the middle delay tap point to produce a set of increment mismatch signals, wherein the set of decrement mismatch signals and the set of increment mismatch signals are used to select one of the plurality of delay taps of the first delay line circuit.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
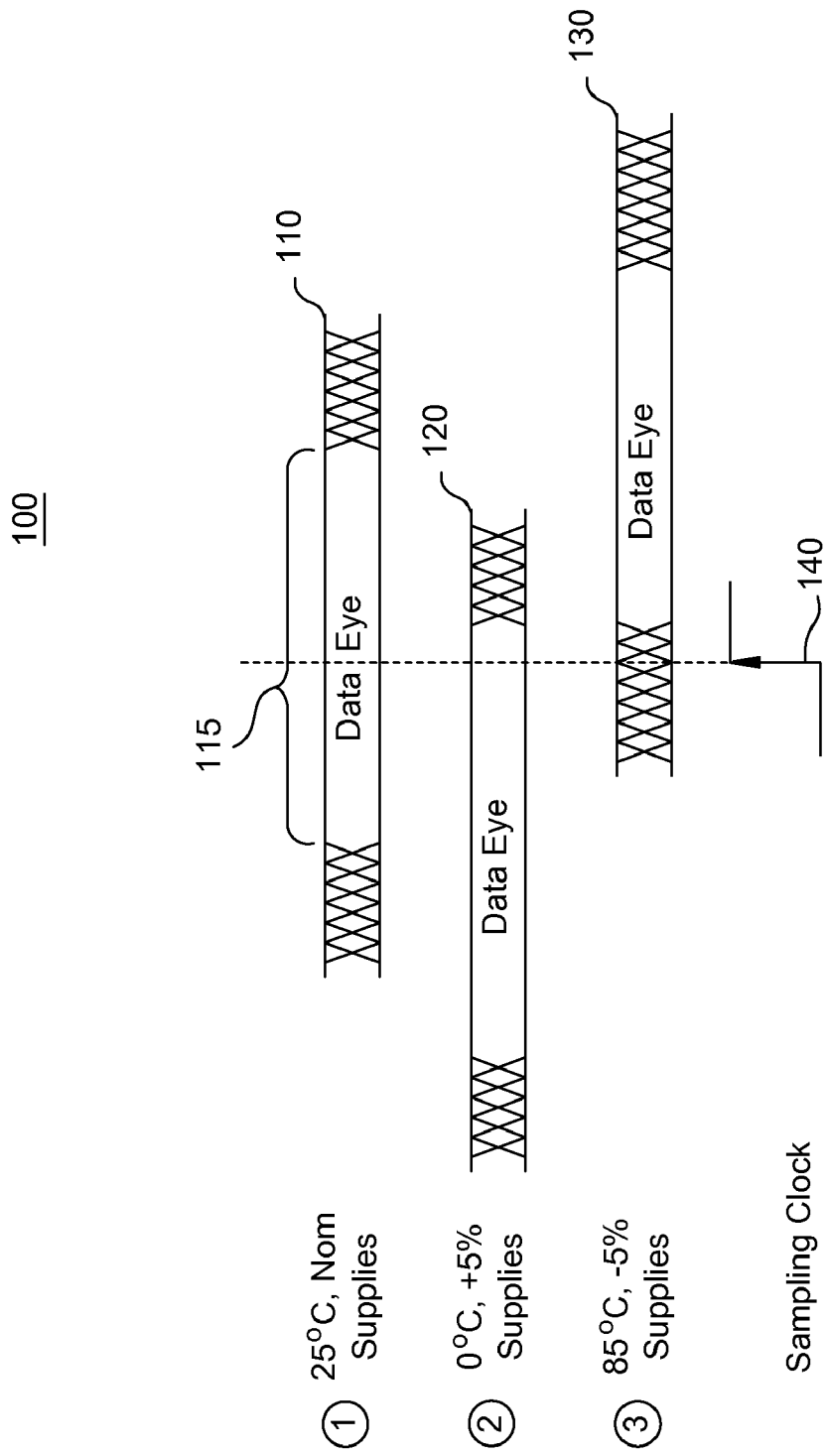
FIG. 1 illustrates an overview of the impact of drift on the position of the data eye for a data stream.

FIG. 1 illustrates an overview of the impact of drift on the alignment of a sampling clock relative to a data eye for a data stream. In one embodiment, the data eye 115 of a first data stream 110 is illustrated with a sampling clock 140 (e.g., a rising edge) that is substantially aligned with the center of the data eye. The data eye is broadly defined as a data region (e.g., one bit of data) of the data stream that contains valid data that can be sampled or captured by a receiver using the sampling clock 140. As illustrated by the first data stream 110, having the sampling clock that is aligned near the center of each data eye will ensure that the receiver will be capturing the proper data. In this illustrative example, the first data stream 110 is received under the condition of 25° C. with normal supply voltage provided to the ICs.

However, the second data stream 120 is received under the operating condition of 0° C. with a supply voltage approximately 5% higher than normal. In this illustrative example, one can see that the changes in the operating temperature and supply voltage have caused a drift of the sampling clock away from the center of the data eye. Although the sampling clock edge is still within the data eye, it has now drifted close to one edge of the data eye, where the possibility of sampling the wrong data has increased significantly.

Finally, the third data stream 130 is received under the operating condition of 85° C. with a supply voltage approximately 5% lower than normal. In this illustrative example, one can see that the changes in the operating temperature and supply voltage have caused a significant drift of the sampling clock away from the center of the data eye. In fact, the sampling clock edge is no longer aligned within the data eye, where it is now sampling the wrong data.

Figure 2:
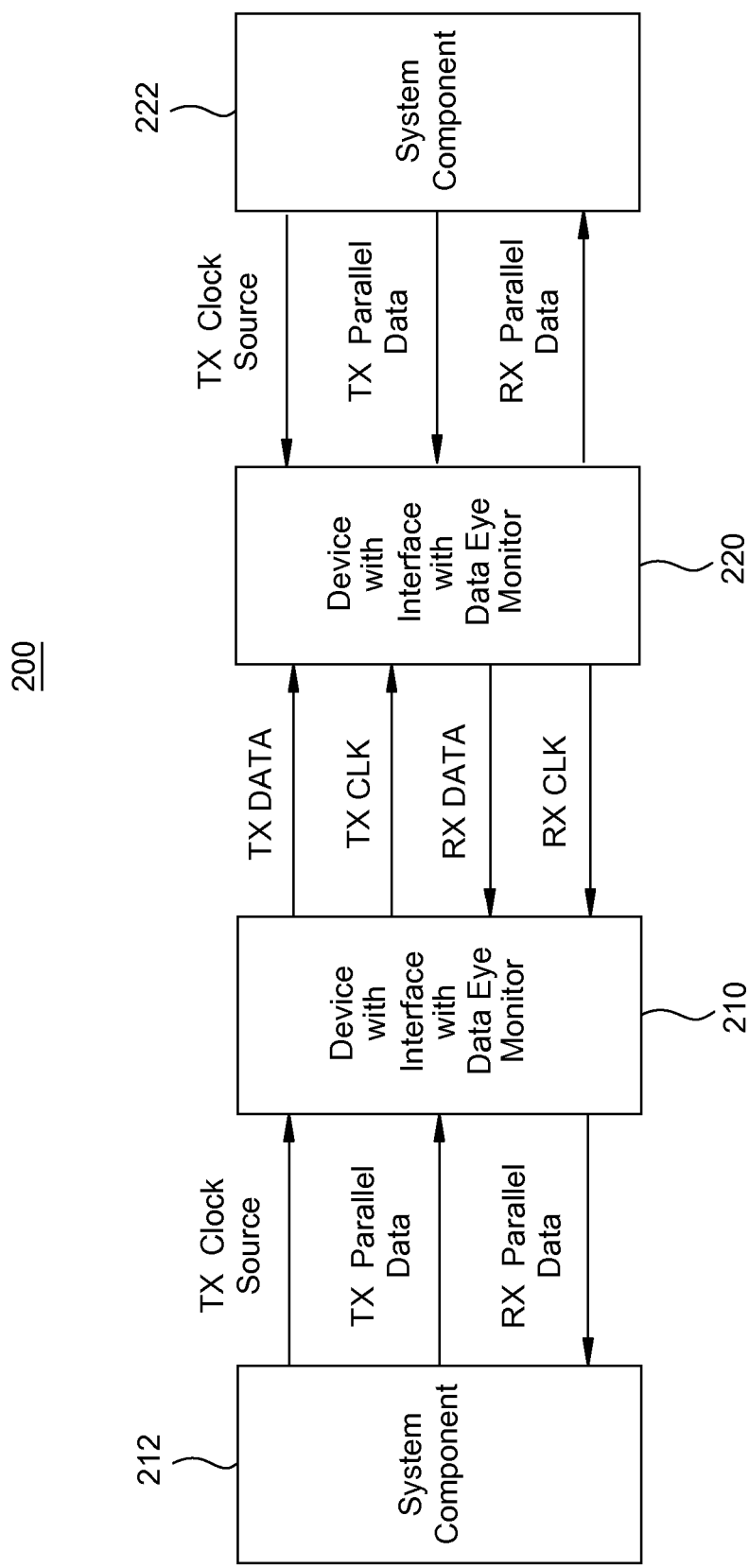
FIG. 2 illustrates a processing system having integrated circuits employing an interface with a data eye monitor in accordance with one embodiment of the present invention.

FIG. 2 illustrates a processing system 200 having integrated circuits employing an interface with a data eye monitor module or circuit in accordance with one embodiment of the present invention. FIG. 2 illustrates two integrated circuits 210 and 220 having a plurality of connections that allow the transfer of data between the two devices. Broadly defined, when a device is transmitting data, then it is operating as a transmitter, whereas when a device is receiving data, then it is operating as a receiver. In this illustrative embodiment, both integrated circuits 210 and 220 can operate as a transmitter or a receiver from the perspective of data transfer. Furthermore, each of the integrated circuits 210 and 220 may also interact with other system components 212 and 222, respectively. In one embodiment, each of the integrated circuits 210 and 220 employs an interface that comprises a data eye monitor. The data eye monitor is provided to adjust clock/data alignment on a data channel in real-time by continuously monitoring the data eye (or broadly a data valid window) of the data channel. For example, the data eye monitor is able to re-position the sampling point when voltage or temperature variations cause the data eye to drift relative to the sampling clock. The data eye monitor will be described in greater detail below.

Figure 3:
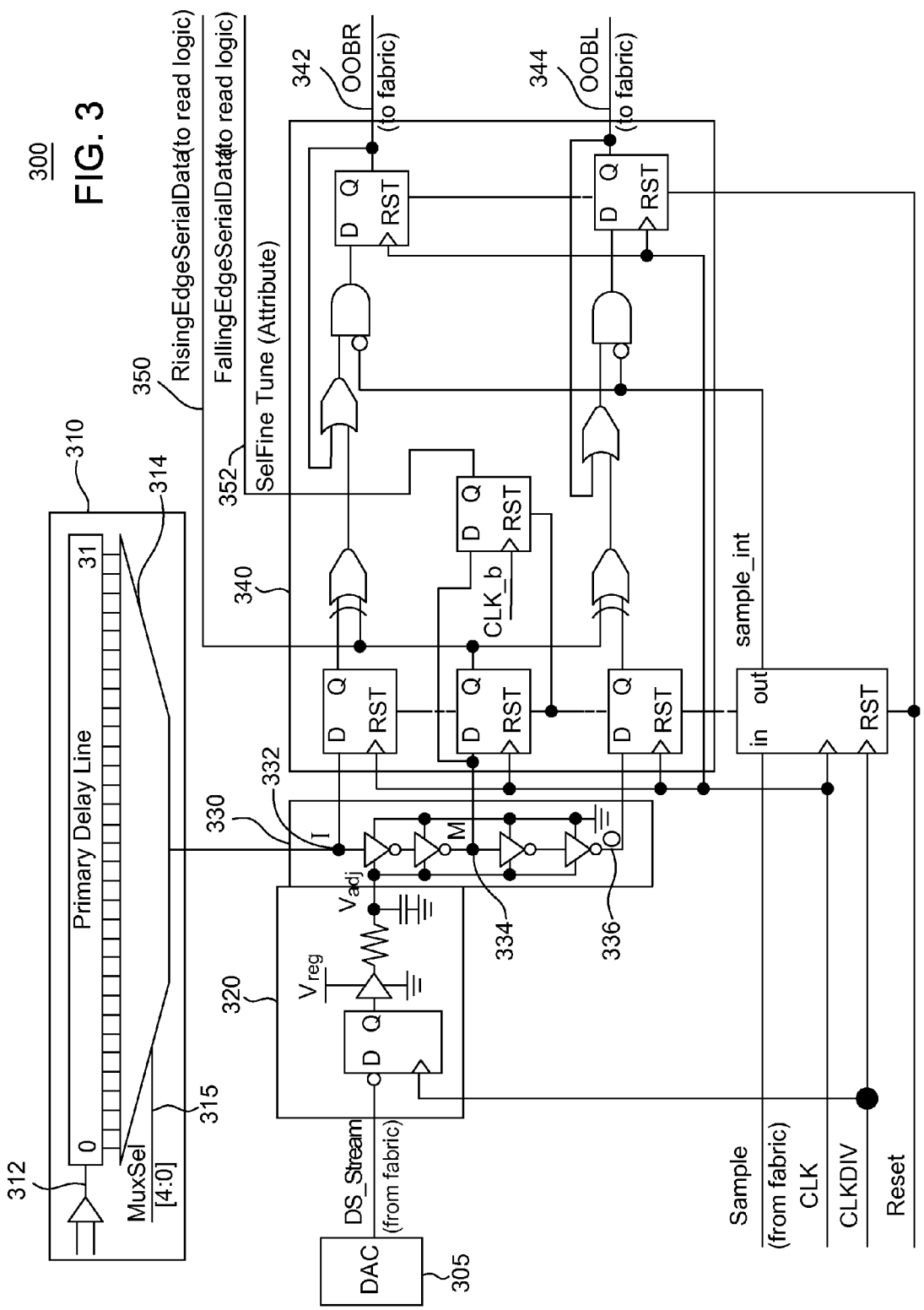
FIG. 3 illustrates a data eye monitor in accordance with one embodiment of the present invention.

FIG. 3 illustrates a data eye monitor 300 in accordance with one embodiment of the present invention. For example, data eye monitor 300 comprises a primary delay line circuit 310 (e.g., a first delay line circuit), a voltage control circuit 320, a voltage-controlled delay line circuit 330 (e.g., a second delay line circuit), and a data compare circuit 340.

In operation, data is received on an input 312 to the primary delay line circuit 310. The data is delayed in accordance with a delay tap (e.g., 32 taps in this example) that is selected by a multiplexer 314. In turn, the multiplexer 314 is controlled by a select signal 315, e.g., a five bit signal to select one of the 32 possible delay taps. For example, the delay tap may be initially selected with the use of a set of training samples. However, once the IC begins to operate over time, e.g., in the field, it may be necessary to select a different delay tap to account for the effect of temperature and supply voltage variations.

In one embodiment, the delayed data from the primary delay line circuit 310 is provided to the voltage-controlled delay line circuit 330. The voltage-controlled delay line circuit 330 comprises a plurality of delay stages. In one embodiment, data is obtained from different parts or points of the voltage-controlled delay line circuit 330, e.g., at the input point (I) 332, at the middle point (M) 334, and at the output point (O) 336. The data obtained at the middle point (M) 334 is the point where the actual data will be sampled and will be provided, e.g., to a real logic on path 350 or 352. It should be noted FIG. 3 illustrates a double data rate (DDR) implementation where data can be sampled on both the rising edge of the sampling clock and the falling edge of the sampling clock. As such, sampled data is provided via path 350 for the rising edge of the sampling signal, and sampled data is provided via path 352 for the falling edge of the sampling signal. However, it should be noted that the data eye monitor 300 can be implemented to support a double data rate (DDR) implementation or a single data rate implementation.

In one embodiment, data will be sampled at the input point (I) 332, at the middle point (M) 334, and at the output point (O) 336 of the voltage-controlled delay line circuit 330. In turn, the data compare circuit 340 compares the data values collected at the input point (I) 332 and at the middle point (M) 334 to determine whether they are different (broadly a true condition or having a value of "1" as described further below) or the same (broadly a false condition or having a value of "0" as described further below). The result of this comparison is provided as an output signal 342, e.g., an out-of-bounds right (OOBR) signal (broadly a first out-of-bounds signal). Similarly, the data compare circuit 340 also compares the data values collected at the middle point (M) 334 and the output point 336 to determine whether they are different or the same. The result of this comparison is provided as an output signal 344, e.g., an out-of-bounds left (OOBL) signal (broadly a second out-of-bounds signal).

To illustrate, if an out-of-bounds right (OOBR) signal indicates that data values collected at the input point (I) 332 and at the middle point (M) 334 are the same, then it means that both the input point (I) 332 and at the middle point (M) 334 are within the data eye. Similarly, if an out-of-bounds left (OOBL) signal indicates that data values collected at the middle point (M) 334 and at the output point (O) 336 are the same, then it means that both the middle point (M) 334 and at the output point (O) 336 are within the data eye. This result may indicate that the sampling clock is likely close to the center of the data eye, but this is only an assumption. For example, it could also indicate that the total delay length of the voltage-controlled delay line circuit 330 may simply be too short. To resolve this uncertainty, the total delay length of the voltage-controlled delay line circuit 330 can be lengthened as described below.

However, if an out-of-bounds right (OOBR) signal indicates that data values collected at the input point (I) 332 and at the middle point (M) 334 are different, then it means that the input point (I) 332 is no longer within the data eye, while the middle point (M) 334 is still within the data eye. Similarly, if an out-of-bounds left (OOBL) signal indicates that data values collected at the middle point (M) 334 and at the output point (O) 336 are different, then it means that the middle point (M) 334 is still within the data eye, while the output point (O) 336 is no longer within the data eye. In either of the above states, it clearly indicates that the sampling signal is very close to or is drifting towards one edge of the data eye. In other words, the input point or the output point is sampling data that is outside of the data eye.

In one embodiment, the out-of-bounds left (OOBL) signal and the out-of-bounds right (OOBR) signal will be used to dynamically adjust either a selection of the delay tap of the primary delay line circuit 310 or a refinement of the voltage-controlled delay line circuit 330. Table 1 below provides a set of illustrative adjustments or actions that can be taken based on the values of the out-of-bounds left (OOBL) signal and the out-of-bounds right (OOBR) signal.

TABLE 1

| OOBL | OOBR | Action |
| --- | --- | --- |
| 0 | 0 | If not already at a maximum point, increase a fine tune delay by 1 |
| 0 | 1 | Increase the primary delay tap circuit selection by 1 |
| 1 | 0 | Decrease the primary delay tap circuit selection by 1 |
| 1 | 1 | If not already at a minimum point, decrease a fine tune delay by 1 |

If the combined signals (OOBL, OOBR) is (0,0), this indicates as discussed above that all three sampling points are still within the data eye. In one embodiment, no action is taken. In an alternative embodiment, as illustrated in Table 1, an adjustment is applied to the voltage-controlled delay line circuit 330.

More specifically, the delay line of the voltage-controlled delay line circuit 330 is effectively separated into two sections (e.g., section one is between input point 332 and middle point 334, and section two is between middle point 334 and output point 336). The delay of these two sections can be adjusted and controlled by the voltage control circuit 320. Furthermore, the delay of these two sections match for all adjustment voltages. In other words, if the control voltage is changed such that the delay is shortened, then the delay for both sections will be similarly shortened. Similarly, if the control voltage is changed such that the delay is lengthened, then the delay for both sections will be similarly lengthened.

In one embodiment, the control voltage is adjusted via a digital to analog converter (DAC) 305, e.g., a DeltaSigma DAC, that is implemented, e.g., in the fabric of a programmable logic device (PLD). As shown in FIG. 3, the input to the voltage control circuit 320 comprises a control signal, DS_stream, that is received from the DeltaSigma DAC. Responsive to the control signal, DS_stream, the voltage control circuit 320 will cause the control voltage ($V_{adj}$) to be adjusted. For example, as the voltage control circuit 320 increases the control voltage ($V_{adj}$), the delay of the two sections of the voltage-controlled delay line circuit 330 will decrease. Similarly, as the voltage control circuit 320 decreases the control voltage ($V_{adj}$), the delay of the two sections of the voltage-controlled delay line circuit 330 will increase. In one embodiment, the control signal, DS_stream, is inverted so that the delay is directly (rather than inversely) proportional to the DAC input value. It should be noted that in one embodiment, an 8-bit DAC (i.e., 256 values) can be deployed. However, it may not be necessary to utilize the entire input range of the DAC, e.g., limiting the range to between 32-224, thereby avoiding the low and high extremes input values because the output of such extreme values may be difficult to filter.

In one embodiment, the combined signals (OOBL, OOBR) will be provided as an input to the DAC only for the states of (0,0) and (1,1). For example, under the state of (0,0), the input to the DAC will be increased by a value of 1, if the voltage-controlled delay line circuit 330 is not already at a maximum total delay. In other words, although it is clear that all three sampling points of the voltage-controlled delay line circuit 330 are still within the data eye, increasing the input value to the DAC will cause the total delay for the voltage-controlled delay line circuit 330 to be lengthened or stretched. The purpose of increasing the total delay is to ensure that the sampling clock is not close to one of the edges of the data eye. For example, as the total delay for the voltage-controlled delay line circuit 330 continues to lengthen due to consecutive states of (0,0), it will eventually reach at least one edge of the data eye, thereby providing an insight into the relative distance between the sampling clock and one edge of the data eye.

In one embodiment, under the state of (1,1), the input to the DAC will be decreased by a value of 1, if the voltage-controlled delay line circuit 330 is not already at a total minimum delay. In other words, two sampling points (the input point and the output point) of the voltage-controlled delay line circuit 330 are both outside of the data eye. Namely, the total delay of the voltage-controlled delay line circuit 330 is simply too long such that both edges of the data eye have been reached. Decreasing the input value to the DAC will cause the total delay for the voltage-controlled delay line circuit 330 to be shortened. For example, as the total delay for the voltage-controlled delay line circuit 330 continues to shorten due to consecutive states of (1,1), it may eventually reach a point where all three points are again within the data eye. However, it is also possible to reach the (0,1) state and (1,0) state directly after a (1,1) state.

In one embodiment, under the state of (0,1), the input to the select control of the multiplexer 314 is changed to increase the primary delay tap selection by 1 (broadly selecting a higher delay tap from a current delay tap). Conversely, in one embodiment, under the state of (1,0), the input to the select control of the multiplexer 314 is changed to decrease the primary delay tap selection by 1 (broadly selecting a lower delay tap from a current delay tap). The reason to adjust the primary delay line circuit 310 instead of adjusting the voltage-controlled delay line circuit 330 under these two states is that it is interpreted that the total delay of the voltage-controlled delay line circuit 330 is probably "sized" correctly. However, since one edge of the data eye has been reached, then selecting a different delay tap at the primary delay line circuit 310 is equivalent to shifting the total delay of the voltage-controlled delay line circuit 330 relative to the data eye. In other words, changing the control voltage $V_{adj}$ will only change the total length of delay (stretching or shrinking the total delay) of the voltage-controlled delay line circuit 330, whereas changing the tap selection of the primary delay line circuit 310 will shift the total length of delay of the voltage-controlled delay line circuit 330 relative to the data eye.

It should be noted that since the combined signals (OOBL, OOBR) are used to change the inputs to the DAC that in turn changes the inputs to the voltage control circuit 320, the data eye monitor 300 effectively has a feedback loop. As such, as the operating conditions change (e.g., in terms of temperature and supply voltage variations) for the receiver, the data eye monitor 300 will be able to dynamically adjust a delay to the data received on the data channel to ensure that the sampling clock is properly aligned with the data eye.

It should be noted that FIG. 3 illustrates a data compare circuit 340 employing a plurality of flip-flops, AND gates, OR gates, and the like, for generating the OOBL and OOBR signals. It should be noted that the data compare circuit 340 is not limited to this particular implementation. Namely, any data compare circuit 340 that is capable of performing the compare operations as discussed above can be used in accordance with the present invention.

Figure 4:
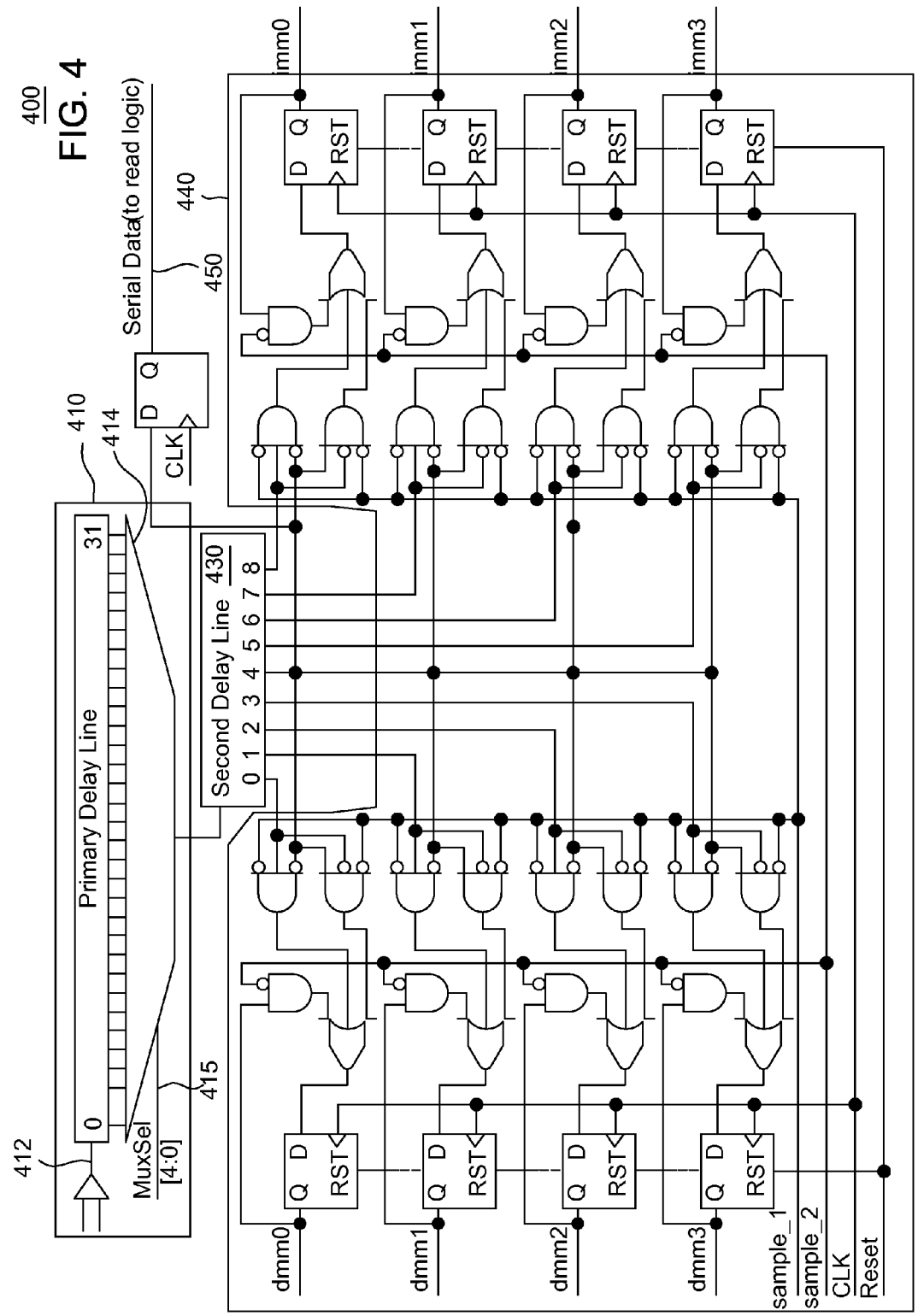
FIG. 4 illustrates a data eye monitor in accordance with an alternate embodiment of the present invention.

FIG. 4 illustrates a data eye monitor 400 in accordance with one embodiment of the present invention. For example, data eye monitor 400 comprises a primary delay line circuit 410 (e.g., a first delay line circuit), a discrete digital delay line circuit 430 (e.g., a second delay line circuit), and a data compare circuit 440.

In operation, data is received on an input 412 to the primary delay line circuit 410. The data is delayed in accordance with a delay tap (e.g., 32 taps in this example) that is selected by a multiplexer 414. In turn, the multiplexer 414 is controlled by a select signal 415, e.g., a five bit signal to select one of the 32 possible delay taps. For example, the delay tap may be initially selected with the use of a set of training samples. However, once the IC begins to operate over time, it may be necessary to select a different delay tap to account for the effect of temperature and supply voltage variations.

In one embodiment, the delayed data from the primary delay line circuit 410 is provided to the discrete digital delay line circuit 430. In one embodiment, the discrete digital delay line circuit 430 comprises a plurality of delay taps, e.g., 9 taps (0-8). In one embodiment, data is obtained from all nine delay taps. The data obtained at the middle point (delay tap 4) is the point where the actual data will be sampled and will be provided, e.g., to a real logic on path 450. It should be noted FIG. 4 illustrates a single data rate implementation where data is sampled on the rising edge of the sampling. However, it should be noted that the data eye monitor 400 can be implemented to support a double data rate (DDR) implementation or a single data rate implementation.

Furthermore, although the discrete digital delay line circuit 430 is illustrated as having nine delay taps, the present invention is not so limited. More specifically, the discrete digital delay line circuit 430 can be implemented using M number of delay taps, where M is an odd number greater than one.

In one embodiment, data will be sampled at all nine delay taps. In turn, the data compare circuit 440 compares the data values collected at the delay taps (0-3) (broadly referred to as a left set of delay taps) and delay taps (5-8) (broadly referred to as a right set of delay taps) with the delay tap 4, (broadly referred to as a middle delay tap) to determine whether they are different or the same. The comparison of each of the left set of delay taps with the middle delay tap will provide a set of decrement mismatch (dmm) signals, e.g., dmm0-3. Similarly, the comparison of each of the right set of delay taps with the middle delay tap will provide a set of increment mismatch (imm) signals, e.g., imm0-3.

To illustrate, if the dmm0 signal indicates that data values collected at the delay tap 0 point and at the delay tap 4 point are the same, then it means that both the delay tap 0 point and the delay tap 4 point are within the data eye. Similarly, if the imm0 signal indicates that data values collected at the delay tap 4 point and at the delay tap 8 point are the same, then it means that both the delay tap 4 point and the delay tap 8 point are within the data eye. This result may indicate that the sampling clock is likely close to the center of the data eye, but this is only an assumption. For example, it could also indicate that the total delay length of the discrete digital delay line circuit 430 may simply be too short.

However, unlike the implementation of the data eye monitor 300 as discussed above, there is no ability to resolve this uncertainty in the data eye monitor 400. The reason is that the total delay length of the discrete digital delay line circuit 430 is fixed. As such, there is no ability to lengthen or shorten the total delay length of the discrete digital delay line circuit 430. Although there is no ability to lengthen or shorten the total delay length of the discrete digital delay line circuit 430, data eye monitor 400 does not need to employ a voltage control circuit as discussed above. This provides a cost saving and reduces the complexity of the data eye monitor 400.

However, if one or more of the dmm signals indicate that data values collected from the left set of delay tap points and at the middle delay tap point are different, then it means that one or more of the left set of delay tap points are no longer within the data eye, while the middle delay tap point is still within the data eye. Similarly, if one or more of the imm signals indicate that data values collected from the right set of delay tap points and at the middle delay tap point are different, then it means that one or more of the right set of delay tap points are no longer within the data eye, while the middle delay tap point is still within the data eye. In either of the above states, it clearly indicates that the sampling signal is very close to or is drifting towards one edge of the data eye. In other words, one or more of the left set or right set of delay tap points are sampling data that is outside of the data eye. Furthermore, since delay tap point 3 and delay tap point 5 are right next to the middle delay tap point 4, an indication that the data value collected at delay tap point 3 or delay tap point 5 as being different from the middle delay tap point 4 will indicate that the sampling clock is extremely close to one edge of the data eye. As such, although the discrete digital delay line circuit 430 may employ any number of delay taps, a greater number of delay taps will provide a higher level of granularity as to how close the sampling clock is to one edge of the data eye.

It should be noted that FIG. 4 illustrates a data compare circuit 440 employing a plurality of flip-flops, AND gates, OR gates, and the like, for generating the decrement mismatch (dmm) signals and the increment mismatch (imm) signals. It should be noted that the data compare circuit 440 is not limited to this particular implementation. Namely, any data compare circuit 440 that is capable of performing the compare operations as discussed above can be used in accordance with the present invention.

In one embodiment, the decrement mismatch (dmm) signals and the increment mismatch (imm) signals will be used to dynamically adjust a selection of the delay tap of the primary delay line circuit 410. In one embodiment, the decrement mismatch (dmm) signals and the increment mismatch (imm) signals are provided to a priority circuit 500.

Figure 5:
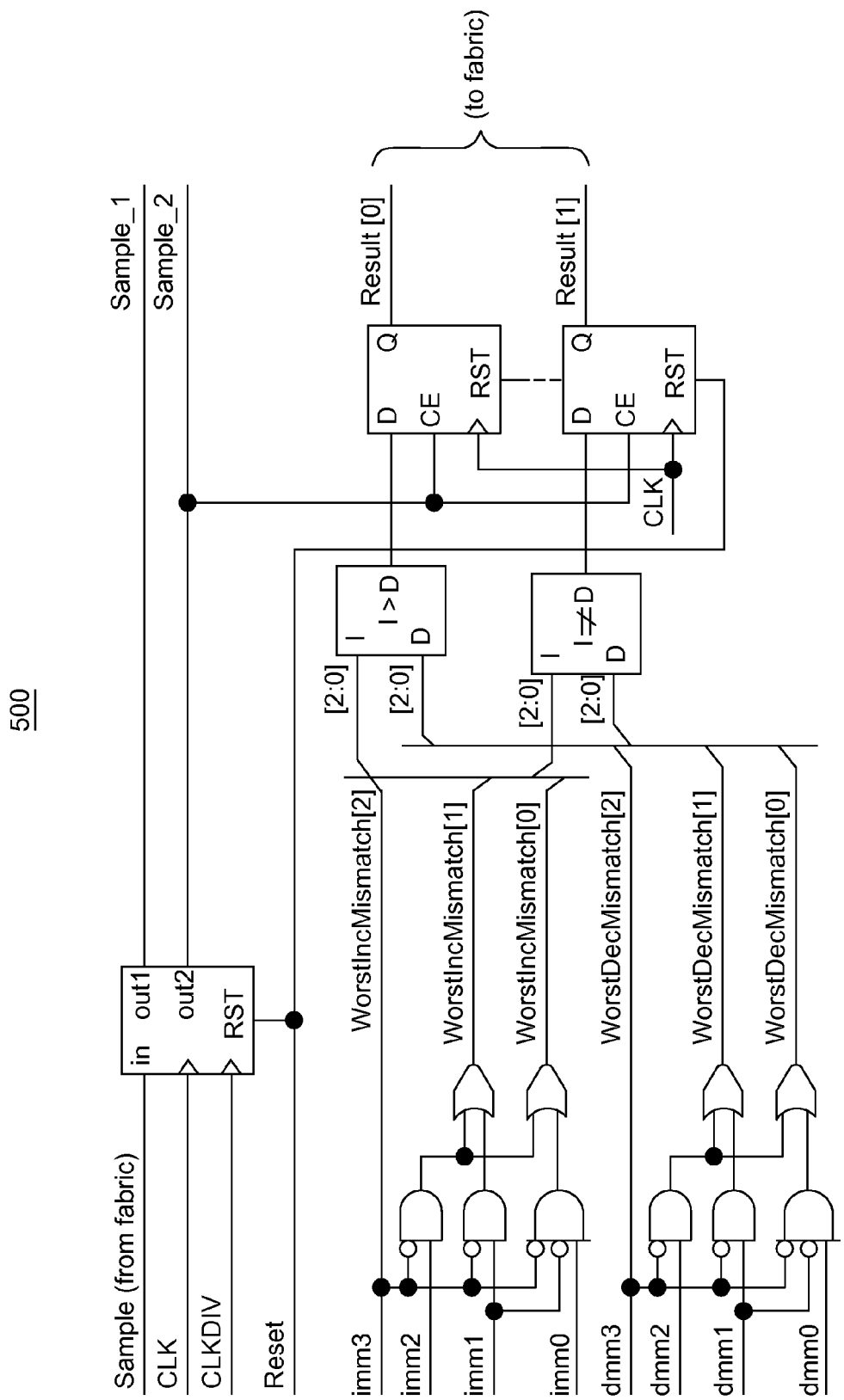
FIG. 5 illustrates a priority circuit in accordance with one embodiment of the present invention.

FIG. 5 illustrates a priority circuit 500 in accordance with one embodiment of the present invention. In one embodiment, the decrement mismatch (dmm) signals and the increment mismatch (imm) signals are encoded via the priority circuit 500 to produce prioritized signals.

As discussed above, depending on the total number of delay taps that are deployed, the left most delay tap (e.g., 0) and the right most delay tap (e.g., 8) are the least important, whereas the immediate left delay tap (e.g., 3) and the immediate right delay tap (e.g., 5) are the most important. Using this as a guideline, each of the decrement mismatch (dmm) signals and the increment mismatch (imm) signals is then treated differently in terms of priority. In other words, in the above example, dmm3 will have a higher priority than dmm0, and imm3 will have a higher priority than imm0. It should be noted that FIG. 5 illustrates only one example as to how decrement mismatch (dmm) signals and the increment mismatch (imm) signals will be prioritized. However, it should be noted that the present invention is not limited to the specific implementation of the priority circuit 500. Any priority circuit that prioritizes the immediate left delay tap and the immediate right delay tap over the left most delay tap and the right most delay tap can be used in accordance with an embodiment of the present invention. Alternatively, other embodiments may assign different priorities for the immediate delay taps relative to the farthest delay taps.

Table 2 below provides a set of illustrative adjustments or actions that can be taken based on the values of the decrement mismatch (dmm) signals and the increment mismatch (imm) signals.

TABLE 2

| Result [1:0] or prioritized signals | Action |
| --- | --- |
| 00 | No change |
| 01 | Unused |
| 10 | Decrement |
| 11 | Increment |

As shown in FIG. 5, the decrement mismatch (dmm) signals and the increment mismatch (imm) signals are encoded using two functions: 1) I>D, and 2) I≠D. The result of the function I>D is stored as result [0], and the result of the function I≠D is stored as result [1]. It should be noted that a value of "1" is broadly interpreted as a true condition, whereas a value of "0" is broadly interpreted as a false condition.

As shown in Table 2, the result (0,0) will cause no action to be taken. The result (0,1) is not used because this result is not possible. The result (1,0) will cause the primary delay line circuit 410 to be decremented, e.g., selecting a lower numbered delay tap, whereas the result (1,1) will cause the primary delay line circuit 410 to be incremented, e.g., selecting a higher numbered delay tap.

It should be noted that since the decrement mismatch (dmm) signals and the increment mismatch (imm) signals are used to adjust the selected delay tap of the primary delay line circuit 410, the data eye monitor 400 effectively has a feedback loop. As such, as the operating conditions change (e.g., in terms of temperature and supply voltage variations) for the receiver, the data eye monitor 400 will be able to dynamically adjust a delay to the data received on the data channel to ensure that the sampling clock is aligned with the data eye.

It should be noted that although the present invention discloses the use of specific two-bit codes, e.g., (0,0), (0,1), (1,0), and (1,1) to illustrate various actions to be taken in accordance with various embodiments of the present invention, the present invention is not so limited. In other words, any number of n-bit codes can be used or inverse of such n-bit codes can be used without departing from the scope of an embodiment of the present invention.

In one embodiment, each of the integrated circuits 210 and 220 as discussed above that employs an interface that comprises a data eye monitor can be a portion of a larger processing unit, e.g., a processor, co-processor, a controller, an application specific integrated circuit (ASIC), a programmable logic device (PLD), e.g., a Field Programmable Gate Array (FPGA), and the like.

Furthermore, in one embodiment, one or more aspects of the present invention relate generally to a programmable logic device (PLD). The PLD is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, the data eye monitor as shown in FIGS. 3 and 4 can be implemented as portions of a PLD, or one or more PLDs. Alternatively, the data eye monitor as shown in FIGS. 3 and 4 may be implemented as a programmable portion of an integrated circuit. In other words, the integrated circuit does not have to be implemented as a PLD.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. A monitor circuit, comprising:
a first delay line circuit having a plurality of delay taps for receiving data from a data channel;
a second delay line circuit having a plurality of points for sampling said data received from said first delay line circuit, wherein said plurality of points comprises an input point, a middle point and an output point;
a voltage control circuit for providing a control voltage to said second delay line circuit; and
a data compare circuit for comparing a data value of said input point and a data value of said middle point to produce a first out-of-bounds signal, and for comparing said data value of said middle point and a data value of said output point to produce a second out-of-bounds signal, wherein said first out-of-bounds signal and said second out-of-bounds signal are used to select one of said plurality of delay taps of said first delay line circuit or to adjust said control voltage provided to said second delay line circuit.

2. The monitor circuit of claim 1, wherein said first out-of-bounds signal and said second out-of-bounds signal are used to dynamically align a sampling clock with a data eye of said data channel.

3. The monitor circuit of claim 1, further comprising:
a digital to analog converter for providing an input to said voltage control circuit for adjusting said control voltage.

4. The monitor circuit of claim 3, wherein if said first out-of-bounds signal has a value of 0 and said second out-of-bounds signal has a value of 0, then said digital to analog converter provides said input to adjust said voltage control circuit to increase a total delay of said second delay line circuit.

5. The monitor circuit of claim 3, wherein if said first out-of-bounds signal has a value of 1 and said second out-of-bounds signal has a value of 1, then said digital to analog converter provides said input to adjust said voltage control circuit to decrease a total delay of said second delay line circuit.

6. The monitor circuit of claim 1, further comprising:
a multiplexer coupled to said first delay line circuit, wherein said multiplexer receives a select signal to select one of said plurality of delay taps of said first delay line circuit.

7. The monitor circuit of claim 6, wherein if said first out-of-bounds signal has a value of 0 and said second out-of-bounds signal has a value of 1, then said multiplexer receives said select signal for selecting a lower delay tap from a current delay tap.

8. The monitor circuit of claim 6, wherein if said first out-of-bounds signal has a value of 1 and said second out-of-bounds signal has a value of 0, then said multiplexer receives said select signal for selecting a higher delay tap from a current delay tap.

9. The monitor circuit of claim 1, wherein said second delay line circuit samples said data in accordance with a double data rate or a single data rate.

10. The monitor circuit of claim 1, wherein the monitor circuit is implemented within a portion of a programmable logic device (PLD).

11. The monitor circuit of claim 1, wherein the monitor circuit is implemented within a programmable portion of an integrated circuit.

12. A monitor circuit, comprising:
a first delay line circuit having a plurality of delay taps for receiving data from a data channel;
a second delay line circuit having a plurality of delay tap points for sampling said data received from said first delay line circuit, wherein said plurality of delay tap points comprises a set of left delay tap points, a middle delay tap point, and a set of right delay tap points; and
a data compare circuit for comparing a data value of each of said set of left delay tap points and a data value of said middle delay tap point to produce a set of decrement mismatch signals, and for comparing a data value of each of said set of right delay tap points and said data value of said middle delay tap point to produce a set of increment mismatch signals, wherein said set of decrement mismatch signals and said set of increment mismatch signals are used to select one of said plurality of delay taps of said first delay line circuit.

13. The monitor circuit of claim 12, wherein said set of decrement mismatch signals and said set of increment mismatch signals are used to dynamically align a sampling clock with a data eye of said data channel.

14. The monitor circuit of claim 12, further comprising:
a priority circuit for prioritizing said set of decrement mismatch signals and said set of increment mismatch signals to produce a prioritized signal; and
a multiplexer coupled to said first delay line circuit, wherein said multiplexer receives a select signal to select one of said plurality of delay taps of said first delay line circuit.

15. The monitor circuit of claim 14, wherein if said prioritized signal comprises a value of (0,0), then no action is taken.

16. The monitor circuit of claim 14, wherein if said prioritized signal comprises a value of (1,0), then said multiplexer receives said select signal for selecting a lower delay tap from a current delay tap.

17. The monitor circuit of claim 14, wherein if said prioritized signal comprises a value of (1,1), then said multiplexer receives said select signal for selecting a higher delay tap from a current delay tap.

18. The monitor circuit of claim 12, wherein said second delay line circuit comprises a discrete digital delay line circuit having M number of delay taps, wherein M is an odd number equal to or greater than five.

19. The monitor circuit of claim 12, wherein the monitor circuit is implemented within a portion of a programmable logic device (PLD).

20. The monitor circuit of claim 12, wherein the monitor circuit is implemented within a programmable portion of an integrated circuit.

* * * * *